Oct. 19, 1965  R. A. OSBOURN ETAL  3,212,495
TEST PATCHES
Filed June 22, 1962  2 Sheets-Sheet 1
FIG.1
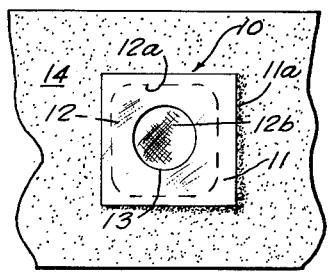
FIG.2   FIG.3
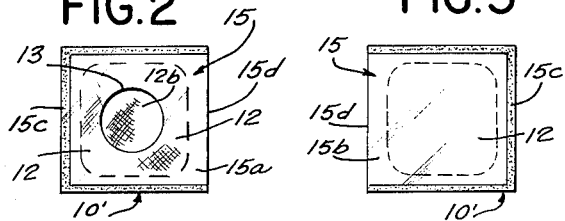
FIG.4
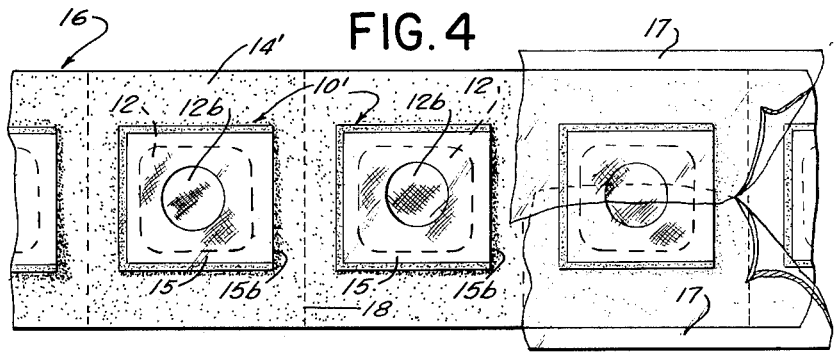
FIG.6
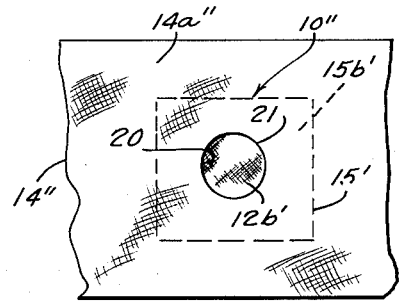
FIG.5
INVENTORS
RAYMOND A. OSBOURN &
THOMAS W. TUSING
BY Beale and Jones
ATTORNEYS Oct. 19, 1965 R. A. OSBOURN ETAL 3,212,495
TEST PATCHES
Filed June 22, 1962 2 Sheets-Sheet 2

INVENTORS
RAYMOND A. OSBOURN &
THOMAS W. TUSING

BY Beale and Jones

ATTORNEYS

3,212,495
SENSITIVITY TEST PATCHES

Raymond A. Osbourn, Chevy Chase, Md., and Thomas W. Tusing, Vienna, Va., assignors to Hazleton Laboratories, Incorporated, Falls Church, Va., a corporation of Virginia
Filed June 22, 1962, Ser. No. 204,424
3 Claims. (Cl. 128—2)

This invention relates to an article for making tests on the skin of man or animals to determine the sensitivity to various substances; and, particularly, to determine the presence or absence of an allergic reaction in a human being to various substances.

It is well known that many people are allergic to one or more subtances. Since allergic manifestations cause a great deal of discomfort to the affected individual, it is frequently necessary to determine to which substances a person is allergic so that the person may either avoid the allergen or be treated to develop an immunity to it. It is often expedient for a manufacturer of a product that will touch human skin to try to determine a priori if such a product will cause skin allergy. This is called prophetic skin testing. Beauty operators, for example, generally test a patron prior to dyeing the hair to insure that the patron is not allergic to the dye.

A common means for determining whether a person is allergic to a particular substance or substances involves the use of patch tests. In making a patch test, the suspected allergen is placed on an area of the skin and covered with a protective material such as a piece of gauze or filter paper which is held in place by adhesive tape. This method is subject to several disadvantages. Adhesive tape quite frequently causes irritation and inflammation of a person's skin in the area of contact. Since a positive test for an allergen is indicated by inflammation, it is frequently difficult to determine whether inflammation of an area of the skin is caused by the adhesive material or by the suspected allergen. Thus, interpretation of the results of the test is hampered.

Moreover, if the suspected allergen is in liquid form and is covered by a patch of an absorbent material, there is a tendency for the liquid to migrate toward the periphery of the patch due to the capillary action of the absorbent material. Therefore, when a plurality of suspected allergens are to be tested simultaneously, each patch test must be spaced sufficiently far apart to prevent one reaction from encroaching on another. Proper spacing of the patch tests requires a sacrifice of available skin surface which is undesirable when a large number of suspected allergens are to be tested.

Furthermore, if each test patch is held in place by an adhesive tape, the liquid form of the test substance, when it reaches the periphery of the patch of absorbent material, may act as a solvent for the adhesive material. Thus, the chemical ingredients in the adhesive substance are unintentionally put on the test site and the skin being tested may react to these ingredients. Hence, a false positive test may be obtained. Moreover, this may also result in the adhesive coming loose and may necessitate repetition of the test.

It is an object of this invention to provide a test patch article to be applied to the skin to determine the presence or absence of an allergic reaction to various substances. It is a further object of this invention to provide such an article which may be used by either medically trained personnel, such as doctors or nurses, or by a layman such as a housewife or beauty operator. It is another object of this invention to provide such an article which maintains the test area segregated from adjacent test areas and/or covering adhesive tape. It is yet another object of this invention to provide such an appliance which will provide that a reservoir of the suspended allergen is available to insure an adequate test.

The foregoing objects are accomplished by this invention which, briefly, consists of a patch test appliance comprising a sheet member of an impermeable material, such as cellophane, polyethylene, polyvinyl chloride, polyvinylidene chloride, etc., which is adapted to be placed into contact with the skin of man or animal. A piece of absorbent material, which is adapted to carry an allergen, overlies a portion of the sheet member. The piece of absorbent material should be of such dimensions so that its outer or peripheral edge does not extend beyond the outer or peripheral edge of the sheet member. The sheet member has an opening therein which is spaced from the peripheral edge of the sheet member. This opening is in registration with a portion of the piece of absorbent material so that a portion of the piece of absorbent material is exposed. The sheet member and the overlying piece of absorbent material are adapted to be secured to a man or animal so that the exposed portion of the piece of absorbent material will be in contact with the skin of the man or animal.

The various embodiments of this invention are illustrated in the accompanying drawings wherein:

FIGURE 1 is a front plan view of a patch test article backed by a piece of adhesive tape.

FIGURE 2 is a front plan view of a preferred form of a patch test article.

FIGURE 3 is a rear view of FIGURE 2.

FIGURE 4 illustrates a plurality of patch test articles arranged on a strip of adhesive material.

FIGURES 5 and 7 illustrate a plurality of patch test articles arranged on strips of non-adhesive material.

FIGURE 6 is a rear view of a piece of adhesive material having secured to the front portion thereof another embodiment of a patch test article.

Figure 7:
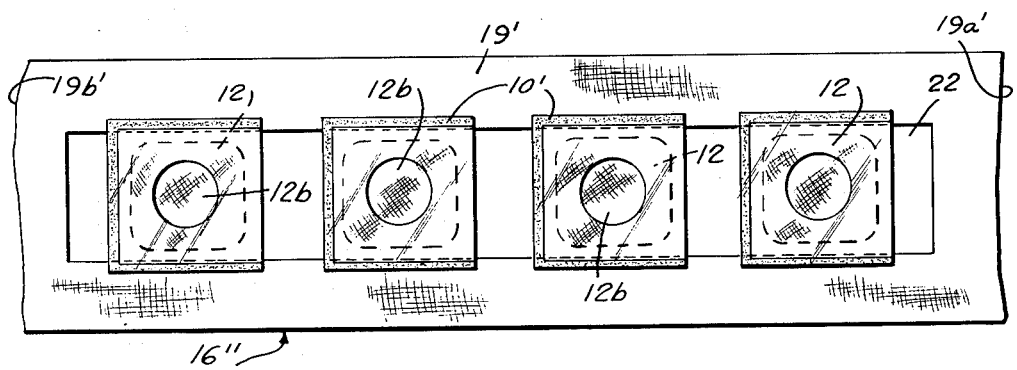

The drawings are more fully explained hereinafter with particular reference to the various numerical designations, each individual numeral having the same significance in the different figures.

Referring to the drawings in detail, FIGURE 1 is a front view of a patch test article 10 which comprises a sheet member 11 of an impermeable material. The material from which the sheet member 11 is formed should be non-toxic and non-irritating to the skin. Suitable materials include cellophane, polyethylene, the various vinyl resins and like materials.

A piece or pad of absorbent material 12, such as gauze, cotton, filter paper, etc., is superimposed under the sheet member 11. The peripheral edge 12a of the piece of absorbent material 12 is preferably spaced from the peripheral edge 11a of the sheet member 11. The absorbent material 12 is adapted to carry or support a suspected allergenic substance.

The sheet member 11 has an opening 13 therein which is spaced a finite distance from the peripheral edge 11a of the sheet member 11. The opening 13 is in registration with a portion of the pad of absorbent material 12 resulting in an exposed portion 12b of the absorbent material.

The patch test article 10 is placed so that only the exposed portion 12b of the absorbent material will be in contact with the skin of a man or animal. The pad of absorbent material 12 may then be impregnated with the suspected allergen and the article 10 may be held in place by means of an adhesive material 14. Alternatively, it may be held in place by means of a band which encompasses the bodily part to which the patch test article is applied, or by other suitable means. Any allergic reaction will be confined to the area of skin in contact with the exposed portion 12b of the absorbent material. The skin area surrounding the skin in contact with the exposed portion 12b of the absorbent material will be protected by the sheet member 11 from inflammation or irritation. Therefore, any inflammation or irritation caused by the adhesive material 14 which is used to hold the patch test article 10 in place will not interfere with an interpretation of the results of the test.

FIGURES 2 and 3 illustrate a preferred embodiment of a patch test article 10' constructed in accordance with this invention. In this embodiment, a piece or pad of absorbent material 12, such as described above, is enclosed by a casing member 15. The patch test article 10' may be formed, for example, by folding a sheet of polyethylene or other impermeable thermoplastic material in half, placing a piece or pad of absorbent material 12 between the halves and heat-sealing the free edges. The casing member 15 thus formed has a front sheet portion 15a and a back sheet portion 15b which are joined, one to the other, by means of the heat sealed edges 15c and their common edge 15d.

The front sheet portion 15a is adapted to be placed into contact with the skin of man or animal. There is an opening 13 in the front sheet portion 15a which is spaced a finite distance from the heat sealed edges 15c and the common edge 15d. The opening 13 is in registration with a portion of the pad of absorbent material 12 resulting in an exposed portion 12b of the absorbent material; and as shown in FIG. 2, front sheet portion 15a provides a wide marginal surface surrounding the edge of opening 13.

As will be described more fully with respect to FIGURE 6, there may also be an opening in the back surface of the casing member 15.

Prior to use, the pad of absorbent material 12 is impregnated with the suspected allergen. If the substance is normally a solid, it may be dissolved or suspended in a suitable inert liquid medium such as distilled water. The patch test article 10' is then placed with the front sheet portion 15a of the casing member and the exposed portion 12b of the pad of absorbent material against the skin. It may be held in place by any suitable means such as by means of adhesive tape.

FIGURE 4 illustrates a patch test strip 16 comprising a strip of adhesive material 14' to which are affixed a plurality of patch test articles 10'—10', having configurations as described above with respect to FIGURES 2 and 3. The patch test articles 10'—10' are placed so that the back sheet portions 15b—15b of the casing members 15—15 are in contact with the adhesive material 14' and the exposed portions 12b—12b of the pads of absorbent material face away from the adhesive material. The strip of adhesive material 14' is provided with a covering means consisting of two strips 17—17 of material such as cellophane. The strips 17—17 run the length of the patch test strip 16 and are secured thereto by contact with the adhesive material 14'. The strips 17—17 overlap at or abut the middle portion of the patch test strip 14' and serve as a protective covering for the test patch articles 10'—10'. Immediately prior to use, a length of the patch test strip 16 containing as many patch test articles 10'—10' as are necessary to make the desired number of tests is separated from the test patch strip 16, for example by cutting or by tearing along the perforated line 18. Of course, if the test patch strip 16 contains exactly as many test patch articles 10'—10' as are necessary, it will not be necessary to cut the strip 16. The covering strips 17—17 are then removed and discarded. Each pad of absorbent material 12—12 is impregnated with a different suspected allergenic substance and the test patch strip is placed on the skin of the person being tested such as on the back or arm. The casing member 15 which envelops the pad of absorbent material 12 keeps a suspected allergen which has a deleterious effect on the adhesive from coming into contact with and loosening the adhesive material 14'. Moreover, there is provided within the casing member 15 a reservoir of the substance being tested. This reservoir insures that an adequate amount of the substance being tested will be present in the exposed portion 12b of the pad of absorbent material to give an accurate indication of an allergic reaction. Furthermore, any allergic reaction will be confined to the area of skin immediately in contact with the exposed portion 12b of the absorbent material. The area of the skin surrounding the part which is in contact with the exposed portion 12b of the absorbent material will be protected by the front or outer surface of the front sheet portion of casing member 15 from any inflammation or irritation which may be caused by the adhesive material 14'.

FIGURE 5 illustrates another form of a test patch strip 16' comprising a strip of non-adhesive material 19 on which are secured a plurality of test patch articles 10'—10'. The test patch articles 10'—10' may be secured to the strip of non-adhesive material by means of stitches or by means of a small amount of adhesive placed on the back of the casing members 15—15. After the pads of absorbent material 12—12 are impregnated with the different substances to be tested, the test patch strip 16' is wrapped around a body part, such as the arm, of the person to be tested, the exposed portions 12b—12b of the pads of absorbent material 12—12 being placed in contact with the skin. The two ends of the strip 19 may be tied or clipped together to hold the test patch strip 16' in place. The casing members 15—15 prevent any reactions from the different test patch articles 10'—10' from encroaching on one another. Therefore, accurate results may be obtained even when the test patch articles 10'—10' are placed very closely together.

FIGURE 6 illustrates another form of test patch article 10''. There is shown the back non-adhesive surface 14a'' of a strip of adhesive material 14''. The test patch article 10'' is constructed exactly as the test patch article 10' described with respect to FIGURES 2 and 3 except that the back sheet portion 15b' of the casing member 15' contains an opening 20 therein. The test patch article 10'' is affixed to the front surface of the strip of adhesive material so that the back sheet portion 15b' of the casing member 15' is in contact with the adhesive surface. The strip of adhesive material 14'' has an opening 21 therein which is in registration with the opening 20 in the back sheet portion 15b' of the casing member 15'. A portion 12b' of the absorbent material is exposed through the registering openings 20 and 21. This embodiment is particularly useful when the substance to be tested is very volatile and which may cause burning of the skin when held in contact with the skin in a high concentration for a prolonged period of time, such as, for example, ether. The test patch article 10'' allows for evaporation through the openings 20 and 21 and prevents such burning. Obviously, the test patch article 10'' may be secured to the skin of a person by means other than an adhesive material. For example, the adhesive material 14'' in FIGURE 6 may be replaced with a porous material which will allow a volatile substance to evaporate through the opening 20 in the back sheet portion 15b' of the casing member 15.

FIGURE 7 illustrates another form of a test patch strip 16'' comprising a strip of non-adhesive material 19' having a longitudinal opening 22 in the surface thereof. Disposed along the length of the longitudinal opening 22 are a plurality of test patch articles 10'—10'. The test patch articles 10'—10' may be secured to the strip of non-adhesive material along the edges of the longitudinal opening 22 by means of stitches or other suitable means. The test patch strip 16'' may be wrapped around a body part of the person being tested so that the exposed portions 12b—12b of the pads of absorbent material 12—12 are in contact with the skin. The two ends 19a' and 19b' of the strip of non-adhesive material 19 may then be clipped together to hold the test patch strip 16'' in place.

The patch test articles of this invention are convenient for use by both medically trained persons and by lay persons. They may be used, for example, by manufacturers to determine before marketing by means of prophetic skin testing whether a product has allergenic potentialities. Moreover, they may be used by beauty operators to test the sensitivity of a patron to a particular hair dye or to a permanent waving lotion. Moreover, they may be sold either individually or in strips, so that persons may determine in their own homes their sensitivity to various substances such as cosmetics, etc.

We claim:

1. A test patch for use in determining the pathological reaction of a mammalian body to substances to which the skin thereof may be sensitive, comprising:
   (a) a pad of absorbent material for holding a test substance to which said skin may be sensitive, and
   (b) a casing member of flexible impermeable sheet material enveloping said pad, said casing member comprising front and back sheet portions connected to each other at an impermeable edge which completely surrounds said pad,
   said front sheet portion consisting only of said impermeable sheet material,
   said front sheet portion having an opening to permit an exposed portion of said pad to contact said skin, the edge of said opening being spaced a distance from said impermeable edge sufficient to provide on said front sheet portion a wide, marginal, skin-contacting and protecting surface entirely surrounding said opening,
   whereby a test substance may be placed in said pad to provide in said casing member a reservoir of said test substance, and said test patch may be applied to said skin with said exposed portion against an area of said skin entirely surrounded by a wide, marginal, skin-contacting and protecting surface of sheet material.

2. A test patch in accordance with claim 1, said pad having in it a substance to which the skin of a mammalian body may be sensitive.

3. A test patch as set forth in claim 1 having a pressure sensitive adhesive-coated member secured to said back sheet portion, said adhesive-coated member being of sufficient length to extend beyond opposite peripheral edges of said casing member for securing the latter to said mammalian body, said wide, marginal skin-contacting surface on said front sheet portion being sufficiently great to separate the area of the skin underlying said opening and that underlying said adhesive-coated member, whereby to provide a clear demarcation between the pathological reaction of the skin to the test substance and to the adhesive.

References Cited by the Examiner
UNITED STATES PATENTS

| | | | |
|---|---|---|---|
| 696,441 | 4/02 | Holmes | 128—268 |
| 797,094 | 8/05 | Benario | 128—156 |
| 2,296,207 | 9/42 | Kittinger | 128—268 |
| 2,836,178 | 5/58 | Barr | 128—155 |
| 2,840,078 | 6/58 | Smith | 128—286 |
| 3,089,488 | 5/63 | Owens | 128—156 |

FOREIGN PATENTS

| | | |
|---|---|---|
| 501,873 | 4/37 | Great Britain. |

RICHARD A. GAUDET, *Primary Examiner.*

JORDAN FRANKLIN, *Examiner.*

UNITED STATES PATENT OFFICE
CERTIFICATE OF CORRECTION

Patent No. 3,212,495            October 19, 1965

Raymond A. Osbourn et al.

It is hereby certified that error appears in the above numbered patent requiring correction and that the said Letters Patent should read as corrected below.

In the grant, lines 1 to 4, for "Raymond A. Osbourn, of Chevy Chase, Maryland, and Thomas W. Tusing, of Vienna, Virginia, assignors to Hazleton Laboratories, Incorporated, of Falls Church, Virginia, a corporation of Virginia," read -- Raymond A. Osbourn, of Chevy Chase, Maryland, and Thomas W. Tusing, of Vienna, Virginia, said Tusing assignor to Hazleton Laboratories, Incorporated, of Falls Church, Virginia, a corporation of Virginia, --; line 13, for "Hazleton Laboratories, Incorporated, its successors" read -- Raymond A. Osbourn, his heirs or assigns and Hazleton Laboratories, Incorporated, its successors --; in the heading to the printed specification, lines 3 to 6, for "Raymond A. Osbourn, Chevy Chase, Md., and Thomas W. Tusing, Vienna, Va., assignors to Hazleton Laboratories, Incorporated, Falls Church, Va., a corporation of Virginia" read -- Raymond A. Osbourn, Chevy Chase, Md., and Thomas W. Tusing, Vienna, Va., said Tusing assignor to Hazleton Laboratories, Incorporated, Falls Church, Va., a corporation of Virginia --.

Signed and sealed this 5th day of July 1966.

(SEAL)
Attest:

ERNEST W. SWIDER                      EDWARD J. BRENNER
Attesting Officer                 Commissioner of Patents